United States Patent [19]

Park et al.

[11] 4,345,949

[45] Aug. 24, 1982

[54] CLEANING REACTORS CONTAMINATED WITH CARBOXYL CONTAINING POLYMERS

[75] Inventors: Hung S. Park, Avon Lake, Ohio; William D. Ryan, Jr., Paducah, Ky.; Harold L. Paine, Wellington, Ohio

[73] Assignee: The B. F. Goodrich Company, Akron, Ohio

[21] Appl. No.: 229,705

[22] Filed: Jan. 30, 1981

[51] Int. Cl.$^3$ .......................... B08B 3/08; B08B 3/10; B08B 9/08
[52] U.S. Cl. .............................. 134/22.16; 134/22.19; 134/38; 252/89.1; 252/133; 252/174.21; 252/558; 252/DIG. 8; 252/DIG. 14

[58] Field of Search ................. 134/22.1, 22.16, 22.19, 134/38; 252/89.1, 133, 174.21, 558, DIG. 8, DIG. 14

[56] References Cited

U.S. PATENT DOCUMENTS

| | | | |
|---|---|---|---|
| 2,798,053 | 7/1957 | Brown | 252/139 UX |
| 3,998,654 | 12/1976 | Falaas et al. | 134/38 X |
| 4,105,574 | 8/1978 | Culmone et al. | 134/38 X |
| 4,130,674 | 12/1978 | Roberts et al. | 134/38 X |

Primary Examiner—Arnold Turk
Attorney, Agent, or Firm—J. Hughes Powell, Jr.

[57] ABSTRACT

Polymerization reactor surfaces coated with carboxyl containing polymers may be readily cleaned by filling the polymerization reactor with an aqueous solution of a surface active agent and a polyvalent metal salt and heating to remove the polymer coating.

7 Claims, No Drawings

CLEANING REACTORS CONTAMINATED WITH CARBOXYL CONTAINING POLYMERS

BACKGROUND OF THE INVENTION

Carboxyl containing polymers of vinylidene monomers containing at least one terminal $CH_2<$ group are well known. Such polymers may be homopolymers, or copolymers with other vinylidene monomers, of unsaturated polymerizable carboxylic acids such as acrylic acid, methacrylic acid, maleic acid, itaconic acid and the like. Often copolymers of these acids are cross-linked with small amounts of cross-linking agents, which in the form of their salts absorb large quantities of water or solvents. These materials are normally prepared by polymerization with a free radical catalyst in an organic medium in a closed vessel or autoclave equipment with stirring. These carboxyl containing polymers prepared in organic media are unstable and at least part of the polymers form deposits on the wall of the reactor during each polymerization. As such deposits build up it becomes difficult to remove heat from the polymerization reaction that is ncessary to control the properties of the polymer, and this requires frequent cleaning of the reactors. After a number of polymerizations, the reactor surfaces are so extensively fouled with polymer deposits as to be extremely difficult to clean. One cleaning method presently used, after about 60 or 70 polymerization charges to prepare cross-linked polyacrylic esters of the type described in U.S. Pat. No. 2,978,053, is to fill the reactor with heated concentrated sodium hydroxide solution. It normally requires from 14 to 30 days to satisfactorily remove the polymer deposits from the reactor wall. This expensive and time consuming operation effectively removes from production each reactor being cleaned for a two to four week period. An improved cleaning process to remove carboxyl containing polymer deposits from reactor walls is desired.

SUMMARY OF THE INVENTION

Polymerization reactors fouled with carboxyl containing polymers coated on the internal surfaces thereof may be readily cleaned if the polymerization reactor is filled with an aqueous solution of an anionic or non-ionic surface active agent and a trivalent metal salt in a molar excess to the amount of carboxyl containing polymer coated on the inner polymerization surfaces and heating for periods of about 36 to 72 hours.

DETAILED DESCRIPTION

The carboxyl containing polymers are prepared from vinylidene monomers containing at least one terminal $CH_2<$ group. Such polymers may be homopolymers or copolymers of an unsaturated, polymerizable carboxylic monomer such as acrylic acid, maleic acid, itaconic acid and the like, or copolymers thereof. Typical materials are those described in U.S. Pat. No. 2,798,053. Copolymers for example, include copolymers of acrylic acid with small amounts of polyalkenyl polyether cross-linkers that are gel-like polymers which especially in the form of their salts, absorb large quantities of water or solvents with subsequent substantial increase in volume. Other useful carboxyl containing polymers are described in U.S. Pat. No. 3,940,351, directed to polymers of unsaturated carboxylic acid and at least one acrylic or methacrylic ester where the alkyl group contains 10 to 30 carbon atoms. Other types of such copolymers are described in U.S. Pat. No. 4,062,817 wherein the polymers described in U.S. Pat. No. 3,940,351 contain additionally another acrylic or methacrylic ester and the alkyl groups contain 1 to 8 carbon atoms. The carboxyl containing polymers have molecular weights greater than about 500 to several million, usually greater than about 10,000 to 900,000 or more. Carboxylic polymers and copolymers such as those of acrylic acid, maleic acid, or the anhydrides also may be cross-linked with divinyl benzene, unsaturated diesters and the like are disclosed in U.S. Pat. Nos. 2,340,110; 2,340,111 and 2,533,635.

These materials are normally prepared in hydrocarbons and chlorinated hydrocarbons, for example, benzene, xylene, tetralin, hexane, heptane, carbon tetrachloride, methyl chloride, ethyl chloride and the like. Polymerizations are disclosed, for example, in U.S. Pat. No. 4,062,817 wherein the polymerizations are desirably conducted in the presence of haloethane or halomethane, preferably containing at least 4 halogen atoms, for example, 1,1,2-trichloro-1,2,2-trifluoroethane. Other carboxyl containing polymers prepared in similar systems include those described in U.S. Pat. Nos. 3,915,921 and 4,066,583. Preferably solvents are used that are solvents for the monomers, but non-solvents for the polymers.

The carboxylic monomers useful in the production of the polymers of this invention are the olefinically-unsaturated carboxylic acids containing at least one activated carbon-to-carbon olefinic double bond, and at least one carboxyl group; that is, an acid containing an olefinic double bond which readily functions in polymerization because of its presence in the monomer molecule, either in the alpha-beta position with respect to a carboxyl group, $-C=C-COOH$; or as a part of a terminal methylene grouping $CH_2=C<$. Olefinically-unsaturated acids of this class include such materials as the acrylic acids typified by the acrylic acid itself, methacrylic acid, ethacrylic acid, alpha-chloro-acrylic acid, alpha-cyano acrylic acid, beta methyl-acrylic acid (crotonic acid), alpha-phenyl acrylic acid, beta-acryloxy propionic acid, sorbic acid, alpha-chloro sorbic acid, angelic acid, cinnamic acid, p-chloro cinnamic acid, beta-styryl acrylic acid (1-carboxy-4-phenyl butadiene-1,3), itaconic acid, citraconic acid, mesaconic acid, glutaconic acid, aconitic acid, maleic acid, fumaric acid, and tricarboxy ethylene. As used herein, the term "carboxylic acid" includes the polycarboxylic acids and those acid anhydrides, such as maleic anhydride, wherein the anhydride group is formed by the elimination of one molecule of water from two carboxyl groups located on the same polycarboxylic acid molecule. Maleic anhydride and other acid anhydrides useful herein have the general structure

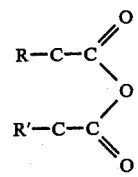

wherein R and R' are selected from the group consisting of hydrogen, halogen and cyanogen ($-C\equiv N$) groups and alkyl, aryl, alkaryl, aralkyl, and cycloalkyl groups such as methyl, ethyl, propyl, octyl, decyl, phenyl, tolyl, xylyl, benzyl, cyclohexyl, and the like.

The preferred carboxylic monomers for use in this invention are the monoolefinic acrylic acids having the general structure

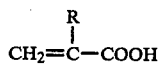

wherein R is a substituent selected from the class consisting of hydrogen, halogen, and the cyanogen (—C≡N) groups, monovalent alkyl radicals, monovalent aryl radicals, monovalent aralkyl radicals, monovalent alkaryl radicals and monovalent cycloaliphatic radicals. Of this class, acrylic and methacrylic acid are most preferred because of generally lower cost, ready availability and ability to form superior polymers. Another useful carboxylic monomer is maleic anhydride or the acid.

The polymers contemplated include both homopolymeric carboxylic acids or anhydrides thereof, or the defined carboxylic acids copolymerized with one or more other vinylidene monomers containing at least one terminal CH$_2$=CH< group. Such materials include, for example, acrylic ester monomers including those acrylic ester monomers having long chain aliphatic groups such as derivatives of an acrylic acid represented by the formula

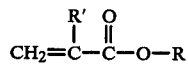

wherein R is an alkyl group having from 10 to 30 carbon atoms, preferably 10 to 20 carbon atoms and R' is hydrogen or a methyl or ethyl group, present in the copolymer in amount, for example, from about 1 to 30 weight percent, and for some uses more preferably, about 5 to 15 weight percent. Representative higher alkyl acrylic esters are decyl acrylate, isodecyl methacrylate, lauryl acrylate, stearyl acrylate, behenyl acrylate and melissyl acrylate and the corresponding methacrylates. Mixtures of two or three or more long chain acrylic esters may be successfully polymerized with one of the carboxylic monomers. One useful class of copolymers are those methacrylates where the alkyl group contains 16 to 21 carbon atoms. Typical polymers have been made with 15±5 weight percent isodecyl methacrylate, 10±3 weight percent lauryl methacrylate, 7±3 weight percent stearyl methacrylate, with acrylic acid.

Other acrylic esters contemplated are also derivatives of an acrylic acid used in amounts, for example, of about 5 to 30 weight percent represented by the formula

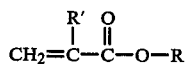

wherein R is an alkyl, alkoxy, haloalkyl, cyanoalkyl, and like groups having from 1 to 9 carbon atoms and R' is hydrogen or a methyl or ethyl group. These acrylic esters are present in the copolymer for some uses in amount from about 5 to 30 weight percent and more preferably from about 5 to 25 weight percent. Representative acrylates include methyl acrylate, ethyl acrylate, propyl acrylate, isopropyl acrylate, butyl acrylate, isobutyl acrylate, methyl methacrylate, methyl ethacrylate, ethyl methacrylate, octyl acrylate, heptyl acrylate, octyl methacrylate, isopropyl methacrylate, 2-ethylhexyl acrylate, nonyl acrylate, hexyl acrylate, n-hexyl methacrylate, and the like. Mixtures of these two classes of acrylates provide useful copolymers.

The polymers also may be cross-linked with any polyfunctional vinylidene monomer containing at least 2 terminal CH$_2$=CH< groups, including for example, butadiene, isoprene, divinyl benzene, divinyl naphthlene, allyl acrylates and the like. A particularly useful group of cross-linking monomers for use in preparing the copolymers, if one is employed, is polyalkenyl polyethers having more than one alkenyl ether grouping per molecule. The most useful possess alkenyl groups in which an olefinic double bond is present attached to a terminal methylene grouping, CH$_2$=C<. They are made by the etherification of a polyhydric alcohol containing at least 4 carbon atoms and at least 3 hydroxyl groups. Compounds of this class may be produced by reacting an alkenyl halide, such as allyl chloride or allyl bromide with a strongly alkaline aqueous solution of one or more polyhydric alcohols. The product is a complex mixture of polyethers with varying numbers of ether groups. Analysis reveals the average number of ether groupings on each molecule. Efficiency of the polyether cross-linking agent increases with the number of potentially polymerizable groups on the molecule. It is preferred to utilize polyethers containing an average of two or more alkenyl ether groupings per molecule. Other cross-linking monomers include for example, diallyl esters, dimethallyl ethers, allyl or methallyl acrylates and acrylamides, tetraallyl tin, tetravinyl silane, polyalkenyl methanes, diacrylates, and dimethacrylates, divinyl compounds as divinyl benzene, polyallyl phosphate, diallyloxy compounds and phosphite esters and the like. Typical agents are allyl pentaerythritol, allyl sucrose, trimethylolpropane triacrylate, 1,6-hexanediol diacrylate, pentaerythritol triacrylate, tetramethylene dimethacrylate, tetramethylene diacrylate, ethylene diacrylate, ethylene dimethacrylate, triethylene glycol dimethacrylate, and the like. Allyl pentaerythritol and allyl sucrose provide excellent polymers in amounts less than 5, as less than 3.0 weight percent.

When the optional cross-linking agent is present, the polymeric mixtures usually contain up to about 5% by weight of cross-linking monomer based on the total of carboxylic acid monomer, plus other monomers, if present and more preferably about 0.1 to 2.0 weight.

Other vinylidene monomers may also be used, particularly in conjunction with acrylic esters, including the acrylic nitriles. α,β-Olefinically unsaturated nitriles useful in the interpolymers embodied herein are preferably the monoolefinically unsaturated nitriles having from 3 to 10 carbon atoms such as acrylonitrile, methacrylonitrile, ethacrylonitrile, chloroacrylonitrile, and the like. Most preferred are acrylonitrile and methacrylonitrile. The amounts used are, for example, for some polymers are from about 5 to 30 weight percent of the total monomers copolymerized.

Acrylic amides include monoolefinically unsaturated amides that may be incorporated in the interpolymers of this invention having at least one hydrogen on the amide nitrogen and the olefinic unsaturation is alpha-beta to the carbonyl group. Representative amides include acrylamide, methacrylamide, N-methyl acrylamide, N-t-butyl acrylamide, N-cyclohexyl acrylamide, N-ethyl acrylamide and others. Very much preferred are acrylamide and methacrylamide used in amounts, for example, from about 1 to 30 weight percent of the total monomers copolymerized. Other acrylic amides include N-alkylol amides of alpha, beta-olefinically unsaturated carboxylic acids including those having from 4 to 10 carbon atoms such as N-methylol acrylamide, N-ethanol acrylamide, N-propanol acrylamide, N-methylol methacrylamide, N-ethanol methacrylamide, N-methylol maleimide, N-methylol maleamide, N-methylol maleamic acid, N-methylol maleamic acid esters, the N-alkylol amides of the vinyl aromatic acids such as N-methylol-p-vinyl benzamide, and the like and others. The preferred monomers of the N-alkylol amide type are the N-alkylol amides of alpha, beta-monoolefinically unsaturated monocarboxylic acids and the most preferred are N-methylol acrylamide and N-methylol methacrylamide used in amounts for example of about 1 to 20 weight percent. N-alkoxymethyl acrylamides also may be used. It is thus intended that where references are made herein regarding the essential N-substituted alkoxymethyl amides, the term "acrylamide" includes "methacrylamide" within its meaning. The preferred alkoxymethyl acrylamides are those wherein $R_6$ is an alkyl group containing from 2 to 5 carbon atoms and useful is N-butoxymethyl acrylamide.

These copolymers may include as little as 8 weight percent of the total polymer of a carboxyl containing monomer, up to 100%, i.e. homopolymer. A useful range of materials include those containing about 8 to 99 weight percent carboxyl containing monomer, with 92 to 1 weight percent of other vinylidene comonomers as described. Particularly useful copolymers contain greater than 40 percent acid and preferably greater than 70 weight percent acid.

Other vinylidene comonomers generally include in addition to those described above, at least one other olefinically unsaturated monomer, more preferably at least one other vinylidene monomer (i.e., a monomer containing at least one terminal $CH_2=CH<$ group per molecule) copolymerized therewith, for example up to about 30% or more by weight of the total monomers. Suitable monomers include α-olefins containing from 2 to 12 carbon atoms, more preferably from 2 to 8 carbon atoms; dienes containing from 4 to 10 carbon atoms including butadiene; vinyl esters and allyl esters such as vinyl acetate; vinyl aromatics such as styrene; vinyl and allyl ethers and ketones such as vinyl methyl ether and methyl vinyl ketone; cyanoalkyl acrylates such as α-cyanomethyl acrylate, the α-,β- and γ- cyanopropyl acrylates; vinyl halides and vinyl chloride, vinylidene chloride and the like; esters of maleic and fumaric acid and the like; divinyls, diacrylates and other polyfunctional monomers such as divinyl ether, diethylene glycol diacrylate, ethylene glycol dimethacrylate, methylene-bis-acrylamide, allylpentaerythritol, and the like; and bis(β-haloalkyl) alkenyl phsophonates such as bis(β-chloroethyl) vinyl phosphonate and the like. Copolymers wherein the carboxyl containing monomer is a minor constituent, and the other vinylidene monomers are present on major components are readily prepared in accordance with the process of this invention.

Polymerization of the monomers in the solvent medium is usually carried out in the presence of a free radical catalyst in a closed vessel in an inert atmosphere and under autogeneous pressure or artificially-induced pressure, or in an open vessel under reflux at atmospheric pressure. Temperature of the polymerization may be varied from about 0° to 100° C. or lower or higher, depending to a degree on the molecular weight desired in the polymer. Polymerization at 50° to 90° C. under autogeneous pressure using a free radical catalyst is generally effective in producing a polymer yield of 75% to 100%. Typical free radical forming catalysts include peroxygen compounds such as sodium, potassium and ammonium persulfates, caprylyl peroxide, benzoyl peroxide, hydrogen peroxide, pelargonyl peroxide, cumene hydroperoxides, tertiary butyl diperphthalate, tertiary butyl perbenzoate, sodium peracetate, sodium percarbonate, and the like as well as azo diisobutyryl nitrile, hereinafter referred to as azoisobutyronitrile. Other catalysts utilizable are the so-called "redox" type of catalyst and the heavy-metal activated catalyst systems. Ultra-violet light may also be used as a source of free radicals. Some systems polymerize solely by heat, but catalysts provide between control. The monomer may be batch charged or continuously added during the course of polymerization or by any other manner of polymerization techniques conventionally used.

As stated, the polymerizations are normally conduted in inert diluents having some solubilizing effect on one or more of the monomeric ingredients, but substantially none on the resulting polymers. In otherwords, the medium used for the polymerization is one in which the monomers are preferably soluble and the polymer is substantially insoluble. Such materials are normally organic liquids which are solvents for the monomers, but nonsolvents for the polymers, or a mixture of such solvent so that the polymer product is preferably obtained as a very fine friable or fluffy precipitate. Typical solvents include benzene, xylene, tetralain, hexane, heptane, cyclohexane, carbon tetrachloride, chloroform, trichloroethylene, methyl chloride and ethyl chloride; chlorofluoroalkanes such as chlorofluoromethane and chlorofluoroethane containing at least four halogen atoms; esters such as methyl acetate, ethyl acetate and butyl propionate; ketones such as methylethylketone, acetone, and dioxane; alcohols including methanol, ethanol, butanol and the like. The amount of organic medium used normally will be in excess of the monomers to be polymerized and the proportion may vary from at least 1 weight percent of monomers and 99 weight percent organic medium up to about 50 weight percent monomers and 50 weight percent organic medium, more normally a concentration of about 5 to 20 weight percent organic monomers is employed.

In the compositions used to clean the reactor any of the general types of anionic or non-ionic surface active agents may be employed. Typical anionic emulsifiers or dispersants that may be used include those types known to those skilled in the art, for example, as disclosed beginning page 102 in J. Van Alphen "Rubber Chemicals" Elsevier, 1956, for example, the alkali metal or ammonium salts of the sulfates of alcohols containing from 8 to 18 carbon atoms such as, for example, sodium lauryl sulfate, ethanol amine lauryl sulfate and ethyl amine lauryl sulfate; alkali metal and ammonium salts of sulfonated petroleum or paraffin oils; sodium salts of aromatic sulfonic acids such as dodecane-1-sulfonic acid and octadiene-1-sulfonic acid; aralkyl sulfonates such as sodium isopropyl benzene sulfonate and sodium dodecyl benzene sulfonate; alkali metal and ammonium salts of sulfonated dicarboxylic acid esters such as sodium dioctyl sulfosuccinate and disodium N-octadecyl sulfosuccinamate; alkali metal or ammonium salts of the free acids of complex organic mono- and diphosphate esters and the like.

The alkali metal and ammonium salts of the aromatic sulfonic acids and the sodium salts of the aralkyl sulfonates of the formula R—[Ar-SO₃]M⁺ wherein R is alkyl or alkenyl, having 8 to 20 carbon atoms such as octyl, decyl, dodecyl, alkoxy or ethoxy groups, or aryl such as a phenyl radical of the formula

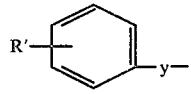

wherein R' is H or an aliphatic radical containing 1 to 16 carbon atoms as the butyl, decyl, dodecyl and like alkyl or alkenyl radicals, y is CH₂ or O, and naphthyl,

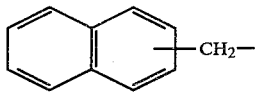

Ar is benzyl or naphthyl and M is an alkali metal or NH₄, long chain alkyl sulfonates and poly(oxyalkylene) sulfonates are a useful class of materials.

Non-ionic surface active agents include a variety of polyethers such as polyoxyethylene, sorbitol laurate, polyoxyethylene lauryl ether, polyoxyethylated fatty alcohols, polyoxyethylene condensation products of amide esters, polyoxyethylene stearates, polyoxyethylene esters of fatty and resin acids, alkylaryl polyether alcohols; partly esterified poly alcohols such as glycerol, monostearate, diethylene glycol laurate, sorbitan ester of fatty acids, diethylene glycol stearates and laurates; polyethanol amine condensates of fatty acids; alcohol amine fatty acid condensates and the like. A typical useful class of these non-ionic materials are materials of the formula

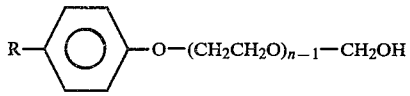

where R is an alkyl radical containing 6 to 12 carbon atoms as nonyl, octyl, isooctyl and the like. In the formula n represents the number of molds of ethylene oxide. The amount of ethylene oxide based on the weight of alkyl phenyl may be varied from about 20 to about 90 percent ethylene oxide, more normally about 40 to about 70 weight percent. Such materials include, for example, nonylphenoxy poly(ethyleneoxy)ethanol as representative of alkylaryl polyether non-ionic agents. Also included are alkylaryl polyether alcohols, polyoxyethylene sorbitan monoesters as the laurate and the like.

Any trivalent metal salt may be used including for example salts of aluminum, antimony, bismuth, chromium, cobalt, nickel and the like. Any of the monomer salts may be used including chloride, nitrates, sulfates, acetates, phosphates and other water soluble salts of organic and inorganic acids. The aluminum salts are a preferred class of materials because of availability, cost and efficiency in converting the solid polymer deposit on the walls of the reactor into a finely divided form that can be readily removed or dispersed by the surface active agent. Aluminum acetate for example is very effective in cleaning reactor walls coated with carboxyl containing polymers, particularly in conjunction with a non-ionic surface active agent. The amount of trivalent salt added is at least a molar amount to react with the carboxyl groups of the carboxyl polymers, more normally a molar excess. Useful is at least 2 moles of salt to 1 mole of carboxyl groups. Larger amounts may be used but are not necessary.

In general, the reactors are cleaned by first estimating the amount of carboxyl polymer adhered to the inner surface of the reactor, adding a molar excess of the trivalent metal salt to the reactor based on the free carboxyl content of the carboxyl containing polymer, adding water and a surface acting agent. More specifically, after the amount of carboxyl containing polymer fouling the reactor is estimated, there is added about one-half to about 5 more, usually about 1 to 2 weight percent of surface active or dispersion agents based on the weight of the polymer and one calculates the amount of trivalent salt to be used in excess of about 30 to 50 weight percent of the carboxyl content of the polymer. The order is not critical and the salt and surface active agent may be added as solutions or to water already in the reactor. After the necessary ingredients are added to the reactor, it is filled with water heated to a temperature greater than room temperature up to, of course, the boiling point of water, usually about 150° F., and with agitation allowed to remain in the reactor until substantially all of the deposited carboxyl containing polymer is removed. Additional agents may be added if needed. The cleaning may be conducted in one step or in multiple steps. Combinations of surface active agents and salts may be employed as well as non-sequestrene and synergistic agents such as phosphates, carbonates, silicates and the like.

To demonstrate one aspect of the practice of the invention, a multiple step process was conducted as follows. To a reactor contaminated with approximately 200 lbs. of a light cross-linked polyacrylic acid, prepared as described in Example 5 of U.S. Pat. No. 2,798,053 cited above, there was added 15 gal. of 20 percent sodium metasilicate, 100 lbs. of aluminum acetate and 8 lbs. of Alconox, a homogeneous blend of lauryl alcohol sulfate and alkylaryl sulfonate, the reactor filled with water, heated to 150° F. and agitated for 6 hours. At the end of this time, the reactor was drained and it was estimated that half of the deposited carboxyl containing polymer had been removed. The reactor was then filled again with 50 lbs. of aluminum acetate, 2 lbs. of Alconox, filled with water, heated, and agitated for 6 hours and drained. The reactor was then filled with 5 gal. of 20 percent sodium metasilicate, filled with water, heated, and agitated for 6 hours and the reactor drained. The reactor was then filled with 2.0 lbs. of Alconox and 2.0 1 gal. of sodium metasilicate solution, filled with water, heated, and agitated for 6 hours and drained, and this latter step repeated once more. A high pressure water nozzle was used to remove all traces of adhering carboxyl containing polymers. The total elapsed time for cleaning the reactor was about 48 hours. This is to be contrasted to the several week period normally required to clean the reactor with concentrated caustic solution.

When this run is repeated as a batch treatment, rather than in steps, the reactor is found to be readily cleaned.

When the cleaning process is repeated in coated reactors using a non-ionic emulsifier such as nonyl phenoxy poly(ethyleneoxy)ethanol rather than the anionic Alconox, excellent cleaning results in only 2 or 3 days was observed. Both aluminum triacetate and aluminum mono-acetate have been found to be exceptionally efficient in the practice of this invention in conjunction with non-ionic and anionic surface active agents.

We claim:

1. A process for cleaning a polymerization vessel contaminated with carboxyl containing polymers adhering to the inner surfaces thereof comprising adding to said vessel a trivalent metal salt, a surface active agent and water, heating the resulting solution and stirring to effectively remove said deposit of carboxyl containing polymer.

2. A process of claim 1 wherein said carboxyl containing polymer contains greater than 40 weight percent polymerized $\alpha,\beta$-carboxylic acid, and said surface active agent is an anionic or non-ionic surface active agent.

3. A process of claim 2 wherein said carboxyl containing polymer contains greater than 70 weight percent acrylic acid, said anionic surface active agent is an alkyl sulfate or an alkylaryl sulfonate and the salt is an aluminum salt.

4. A process of claim 3 wherein said aluminum salt is an aluminum acetate.

5. A process of claim 2 wherein said non-ionic surface active agent is a polyether and said trivalent metal is aluminum.

6. A process of claim 5 wherein said polyether has the formula

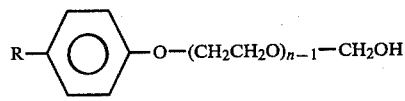

wherein R is an alkyl radical containing 6 to 12 carbon atoms and said salt is aluminum acetate.

7. A process of claim 6 wherein R contains 8 or 9 carbon atoms.

* * * * *